(12) United States Patent
Maeda et al.

(10) Patent No.: US 7,983,545 B2
(45) Date of Patent: Jul. 19, 2011

(54) IMAGE BLUR CORRECTION UNIT, LENS BARREL DEVICE, AND CAMERA APPARATUS

(75) Inventors: Ippei Maeda, Saitama (JP); Tatsuyuki Nakayama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/460,374

(22) Filed: Jul. 17, 2009

(65) Prior Publication Data
US 2010/0021150 A1 Jan. 28, 2010

(30) Foreign Application Priority Data
Jul. 23, 2008 (JP) .............................. P2008-190096

(51) Int. Cl.
*G03B 17/00* (2006.01)
(52) U.S. Cl. ..................... 396/55; 348/208.11; 359/557
(58) Field of Classification Search ............... 396/52, 396/55; 348/208.99, 208.2, 208.4, 208.7, 348/208.11; 359/554, 557
See application file for complete search history.

(56) References Cited

U.S. PATENT DOCUMENTS

| 5,266,988 | A | 11/1993 | Washisu |  |
| 7,653,294 | B2 * | 1/2010 | Ishii et al. | 396/55 |
| 2006/0285840 | A1 | 12/2006 | Takahashi |  |
| 2007/0206934 | A1 * | 9/2007 | Ishii et al. | 396/55 |

FOREIGN PATENT DOCUMENTS

| JP | 05289142 A | 11/1993 |
| JP | 2720955 B2 | 3/1998 |
| JP | 2002182259 A | 6/2002 |
| JP | 2005352125 A | 12/2005 |
| JP | 2006-350128 A | 12/2006 |
| JP | 2007192847 A | 8/2007 |
| JP | 2007212876 A | 8/2007 |

OTHER PUBLICATIONS

Office Action from Japanese Application No. 2008-190096, dated Mar. 9, 2010.
Office Action from Japanese Application No. 2008-190096, dated May 25, 2010.

* cited by examiner

*Primary Examiner* — Clayton E Laballe
*Assistant Examiner* — Autumn Parker
(74) *Attorney, Agent, or Firm* — Lerner, David, Littenberg, Krumholz & Mentlik, LLP

(57) ABSTRACT

An image blur correction unit includes the following elements. A holder member, holding either an imager or a lens that constitutes a part of a lens system, moves in a straight line on a plane orthogonal to the optical axis of the lens system. A movable member, attached to a frame that serves as an outermost component, supports the holder member. A guide member guides movement of the holder member relative to the frame. A driving section drives the holder member. The guide member includes a guide shaft fixed to the movable member and support portions provided for the frame, the support portions supporting the guide shaft. The movable member moves relative to the frame while being integrated with the guide shaft.

6 Claims, 16 Drawing Sheets

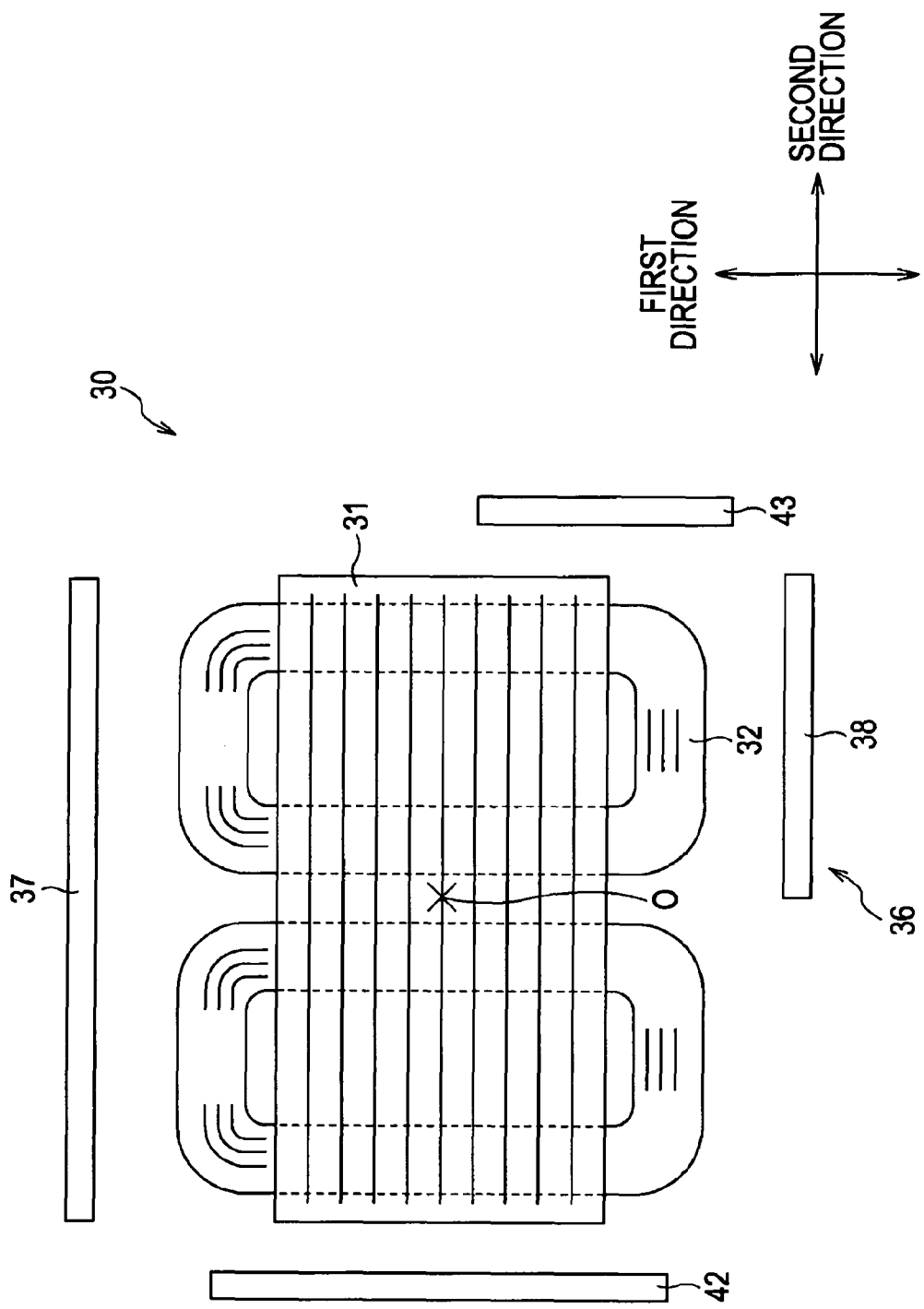

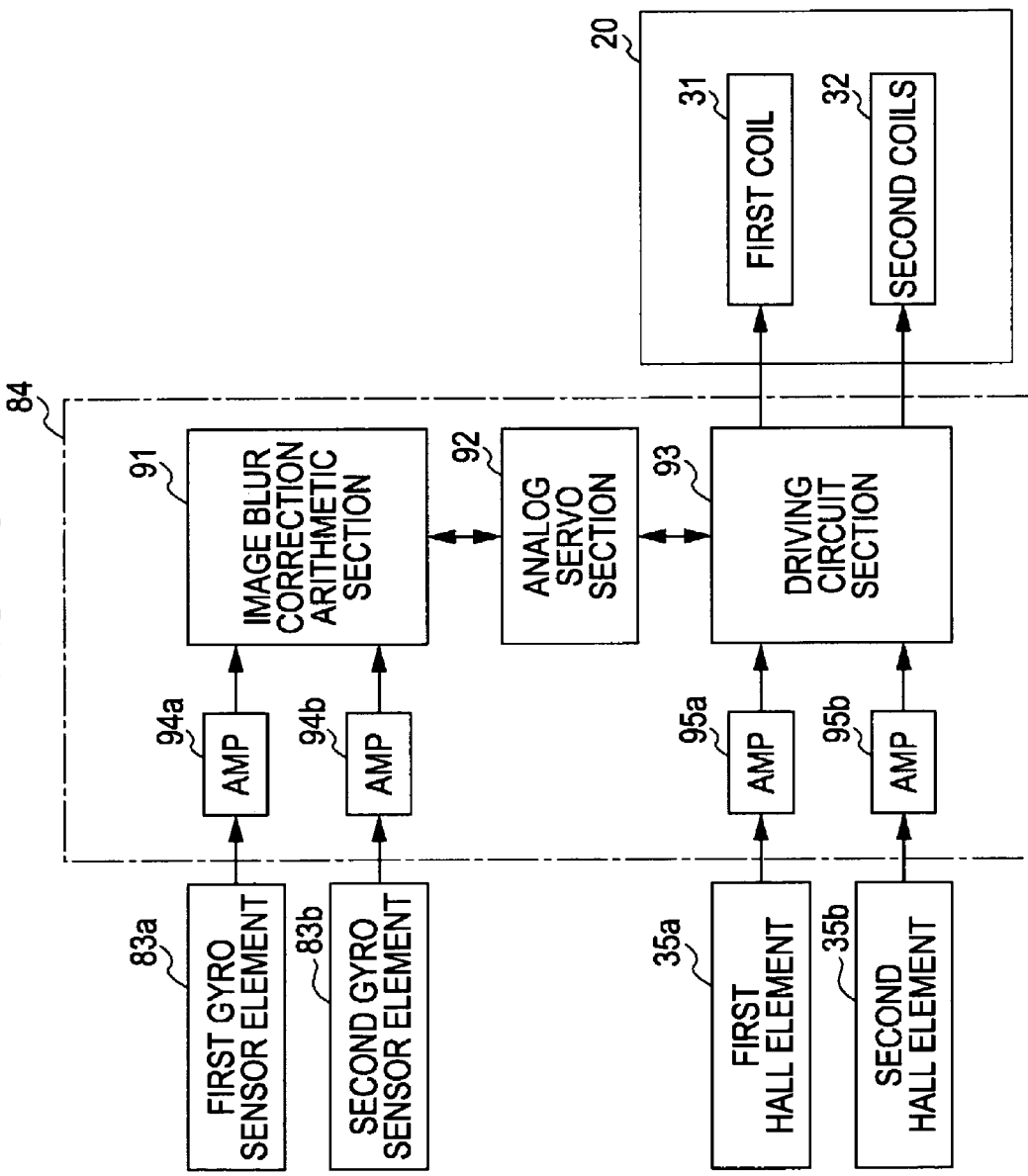

IMAGE BLUR CORRECTION UNIT, LENS BARREL DEVICE, AND CAMERA APPARATUS

CROSS-REFERENCE TO RELATED APPLICATION

The present application claims priority from Japanese Patent Application JP 2008-190096 filed in the Japanese Patent Office on Jul. 23, 2008, the entire content of which is incorporated herein by reference.

BACKGROUND OF THE INVENTION

1. Field of the Invention

The present invention relates to an image blur correction unit, a lens barrel device, and a camera apparatus each correcting an image blur caused by a vibration upon image capture, or imaging.

2. Description of the Related Art

Compact cameras are being requested to be further miniaturized and have higher power (magnification) and higher pixel resolution. Accordingly, this leads to an increased frequency of capturing an image blurred due to camera shake upon capturing an image of a subject. As for a mechanism for shifting an optical element to compensate for camera shake, a retractable optical system and an optical-axis bending optical system each include a mechanism axially sliding in two directions. For example, in a related-art mechanism, the center of gravity of an optical element is placed within an area surrounded by four guide shafts axially sliding in two directions.

For example, in an image blur correction mechanism included in a device disclosed in Japanese Patent No. 2720955 (U.S. Pat. No. 5,266,988), a lens holding frame which holds a correction lens is held by a first holding frame having a pair of pitch shafts such that the lens holding frame is movable in the pitch direction. The first holding frame is supported by a second holding frame having a pair of yaw shafts such that the first holding frame is movable in the yaw direction. The correction lens held by the lens holding frame is located in an area surrounded by the pair of pitch shafts and the pair of yaw shafts. Actuators moving in the pitch direction and actuators moving in the yaw direction are each configured such that magnets and a yoke form a magnetic circuit and a coil is placed in the magnetic circuit. Those actuators generate propulsive forces in the pitch direction and the yaw direction, respectively, using magnetic fields generated by currents flowing through the coils.

In the above-described mechanism disclosed in Japanese Patent No. 2720955, the actuators for driving the correction lens in the pitch direction and the other actuators for driving the correction lens in the yaw direction each have to include the magnets and the yoke. In addition, those actuators are arranged so as to surround the correction lens. Accordingly, the size of the image blur correction mechanism is increased in the direction orthogonal to the optical axis of the correction lens, thus upsizing a lens barrel and the whole of a camera and increasing the number of components. This leads to an increased cost.

In an optical-axis bending lens system in which the optical axis is bent at an angle of 90 degrees, if a correction lens is placed in an area surrounded by four shafts in a manner similar to Japanese Patent No. 2720955, it is difficult to reduce the thickness of a lens barrel, namely, further reduce the thickness thereof in the direction along the optical axis.

Assuming that the correction lens is placed in the area surrounded by the four shafts, in order to reduce the size or thickness of the mechanism, an opening of a holding frame has to be sufficiently larger than the optical effective aperture. Upon reducing the size or thickness of the mechanism, however, it is difficult to ensure that the opening is sufficiently larger than the optical effective aperture. Disadvantageously, a stray light component may enter the optical path, thus causing a ghost image.

The mechanism, in which the correction lens is placed in the area surrounded by the four shafts, functions as an image blur correction unit. The correction unit is incorporated as one unit into a lens barrel. Since this unit is incorporated in the lens barrel, the unit is affected by the size of a frame of the lens barrel. In the unit including a pair of pitch shafts and a pair of yaw shafts, a movable range of the correction lens held by the lens holding frame is also affected by the thickness of the frame constituting the body of the lens barrel. Accordingly, the movable range of the correction lens is restricted by the thickness of the frame. Even when an enough movable range is provided, it is difficult to reduce the size of the image blur correction unit.

As for the pair of pitch shafts and the pair of yaw shafts in this unit, both ends of each shaft are secured to the lens holding frame. A hole in each boss provided for the lens holding frame serves as a slide hole along which the lens is slidable in the axial direction of the corresponding shaft. The accuracy of the sliding direction of the correction lens is determined by the accuracy of the axial direction of each shaft and that of the axial direction of the slide hole in the corresponding boss. Accordingly, so long as the accuracy of the slide hole is not high, it is difficult to correct an image blur with high accuracy.

SUMMARY OF THE INVENTION

The present invention has been made in consideration of the above-described problems. It is desirable to provide an image blur correction unit, a lens barrel device, and a camera apparatus in each of which a correction mechanism for image blur correction can be reduced in size and cost and the accuracy of image blur correction can be increased.

To solve the above-described problems, an image blur correction unit according to an embodiment of the present invention includes the following elements. A holder member, holding either an imager or a lens that constitutes a part of a lens system, moves in a straight line on a plane orthogonal to the optical axis of the lens system. A movable member, attached to a frame that serves as an outermost component, supports the holder member. A guide member guides movement of the holder member relative to the frame. A driving section drives the holder member. The guide member includes a guide shaft fixed to the movable member and support portions provided for the frame, the support portions supporting the guide shaft. The movable member moves relative to the frame while being integrated with the guide shaft.

A lens barrel device according to another embodiment of the present invention includes the following elements. A holder member, holding either an imager or a lens that constitutes a part of a lens system, moves in a straight line on a plane orthogonal to the optical axis of the lens system. A movable member, attached to a frame that serves as an outermost component, supports the holder member. A guide member guides movement of the holder member relative to the frame. A driving section drives the holder member. The guide member includes a guide shaft fixed to the movable member and support portions provided for the frame, the support portions supporting the guide shaft. The movable member moves relative to the frame while being integrated with the guide shaft.

A camera apparatus according to further another embodiment of the present invention includes the following elements. A holder member, holding either an imager or a lens constituting a part of a lens system, moves in a straight line on a plane orthogonal to the optical axis of the lens system. A movable member, attached to a frame that serves as an outermost component, supports the holder member. A guide member guides movement of the holder member relative to the frame. A driving section drives the holder member. The guide member includes a guide shaft fixed to the movable member and support portions provided for the frame, the support portions supporting the guide shaft. The movable member moves relative to the frame while being integrated with the guide shaft.

According to each of the embodiments of the present invention, the guide member includes the guide shaft fixed to the movable member and the support portions, provided for the frame, supporting the guide shaft. The movable member moves relative to the frame while being integrated with the guide shaft. Advantageously, the miniaturized low-profile unit, device, and apparatus can be obtained. In addition, high-accuracy correction can be achieved.

BRIEF DESCRIPTION OF THE DRAWINGS

FIG. 13 is a plan view of the relative positional relationship among a first coil, second coils, a first guide mechanism, and a second guide mechanism;

FIG. 16 is a block diagram of the circuit configuration of a driving control unit for controlling the image blur correction mechanism;

DESCRIPTION OF THE PREFERRED EMBODIMENTS

A digital still camera 1 according to an embodiment of the present invention will be described below with reference to the drawings. The digital still camera 1 will be simply referred to as "camera 1" hereinafter.

(1) Appearance Configuration of Digital Still Camera

Figure 1:
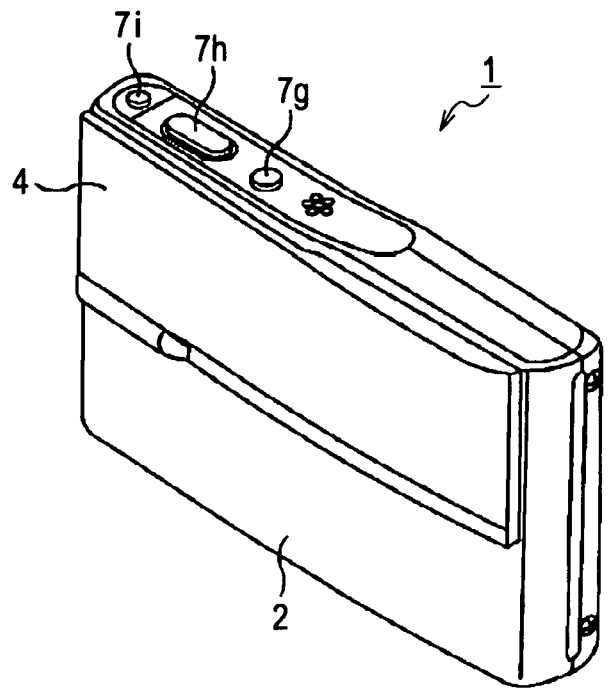
FIG. 1 is a front perspective view of a digital still camera according to an embodiment of the present invention, FIG. 1 illustrating a state in which a lens cover is closed.
Figure 2:
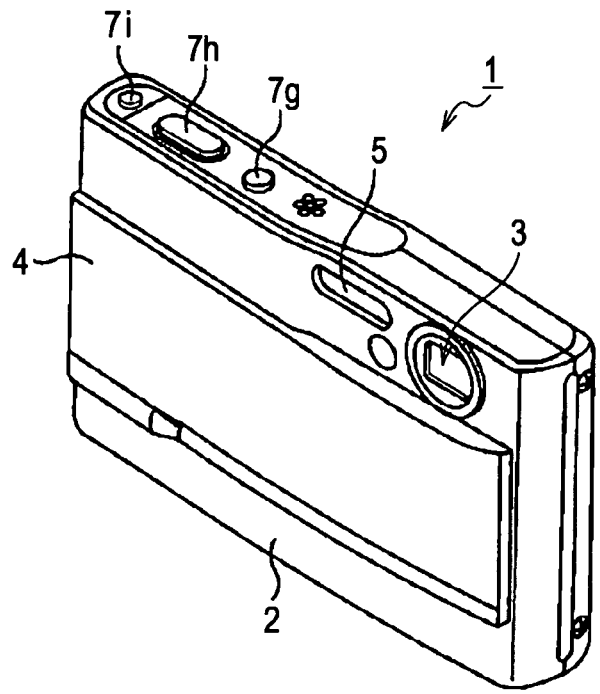
FIG. 2 is a front perspective view of the digital still camera according to the embodiment, FIG. 2 illustrating a state in which the lens cover is open.
Figure 3:
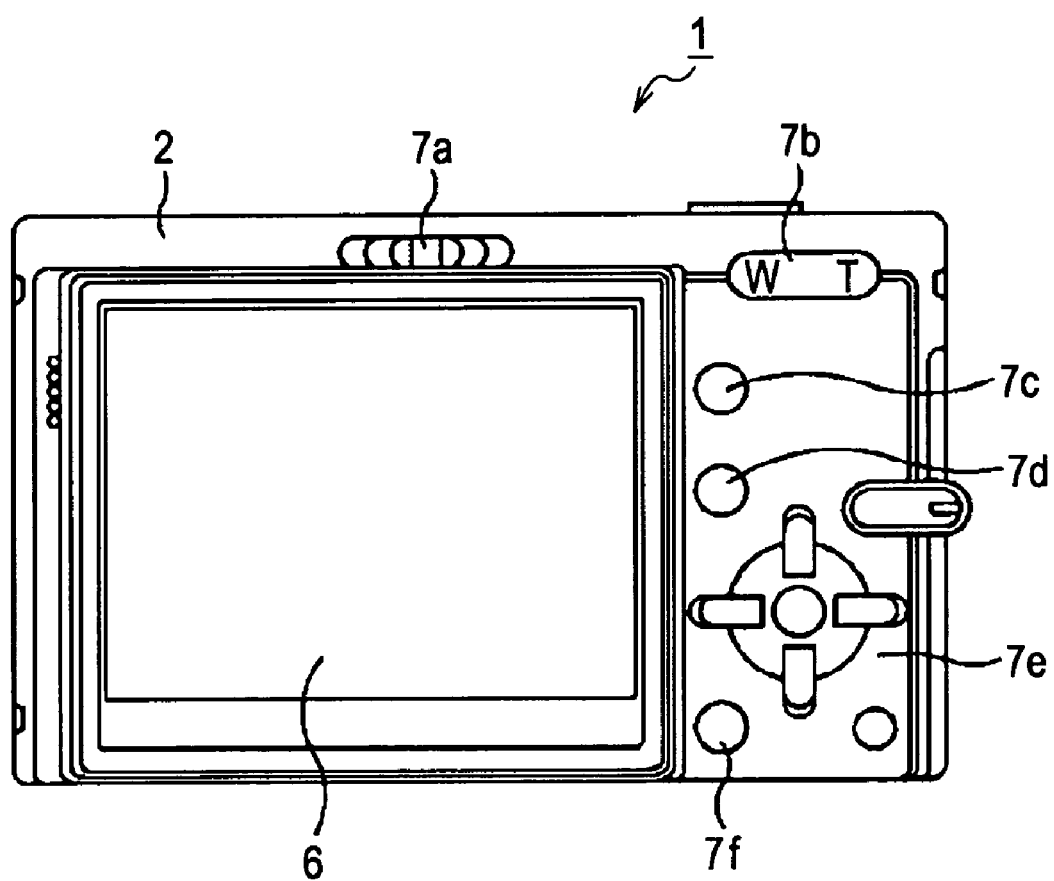
FIG. 3 is a rear view of the digital still camera according to the embodiment.

Referring to FIGS. 1 to 3, the camera 1 according to the present embodiment of the present invention uses a semiconductor recording medium as an information recording medium and converts an optical image, corresponding to light reflected from a subject, into an electrical signal through an imager (e.g., a charge-coupled device (CCD) imager or a complementary metal-oxide semiconductor (CMOS) imager) so that the optical image can be recorded in the semiconductor recording medium or be displayed on a display unit, such as a liquid crystal display (LCD).

The camera 1 has a laterally long and low-profile camera body 2. The camera body 2 has a lens 3 in the front thereof such that the lens 3 is placed in one upper corner. The camera body 2 further has a vertically slidable lens cover 4 in the front thereof such that the lens cover 4 is slid downward upon imaging to expose the lens 3. A flash 5 is provided in the vicinity of the lens 3 so that the flash 5 and the lens 3 are covered with the lens cover 4.

The camera body 2 has a display 6, such as an LCD or an electroluminescent (EL) display, in the rear thereof. The display 6 displays a subject that is to be captured by the imager or captured image data.

The camera body 2 further has various operation switches in the rear thereof. The operation switches include a mode selection switch 7a for selecting a functional mode (for still images, movies, or playback), a zoom button 7b for zoom in/out, a screen display switch button 7c for screen display, a menu button 7d for selection of various menu items, control keys 7e for moving a cursor for selecting a menu item, and a screen button 7f for changing a screen size or deleting an image.

The camera body 2 further has, on the top, a power button 7g for power on/off, a recording button 7h for recording, namely, starting or stopping imaging, and an anti-blur setting button 7i for activating an anti-blur function upon occurrence of camera shake to perform image blur correction.

The camera body 2 further includes therein various components, e.g., a lens barrel, a battery, a microphone, and a speaker.

(2) Configuration of Lens Barrel

Figure 4:
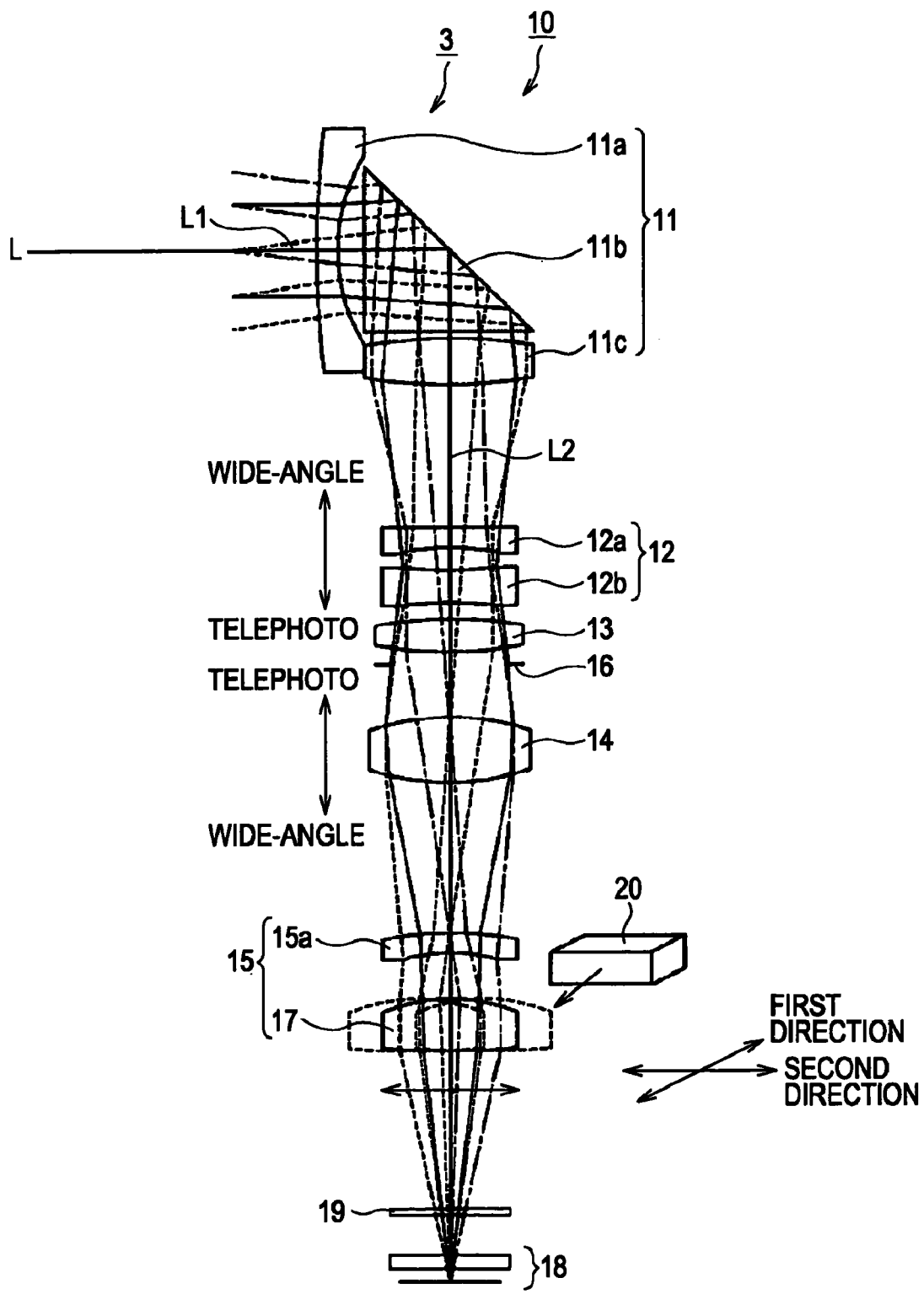
FIG. 4 is a side elevational view of a lens system arranged in a lens barrel.

Referring to FIG. 4, a lens barrel 10 of the camera 1 holds a lens system including a plurality of lenses. The lens system held by the lens barrel 10 is of the optical-axis bending type and includes five lens units 11 to 15 arranged on the same optical axis L. As for the five lens units 11 to 15, the first lens unit 11 is placed on the front side. The first lens unit 11 includes a first lens 11a, serving as an objective lens that faces a subject, a prism 11b placed on the opposite side of the first lens 1a relative to the subject, and a second lens 11c opposed to the prism 11b. The prism 11b includes a triangular prism having a cross section shaped in an isosceles right triangle. One of the two adjacent faces, located at positions displaced by substantially 90 degrees, of the prism 11b is opposed to the first lens 11a and the other face is opposed to the second lens 11c.

The prism 11b bends the optical axis L of the optical-axis bending lens system at an angle of substantially 90 degrees. Accordingly, a first optical axis segment L1 is set adjacent to the first lens 11a, serving as the objective lens, and a second optical axis segment L2 is set adjacent to an imager 18 disposed (on the image forming side) in the direction orthogonal to (or intersecting at 90 degrees) the first optical axis segment L1.

In the first lens unit 11, light passing through the first lens 11a, serving as the objective lens, enters the prism 11b. The light is reflected by the reflecting face, inclined relative to the first optical axis segment L1 at an angle of 45 degrees, of the prism 11b such that the travelling direction of the light is bent at an angle of substantially 90 degrees. The light emerging from the prism 11b passes through the second lens 11c and then travels toward the second lens unit 12 along the second optical axis segment L2. The second lens unit 12, serving as a movable lens unit for zooming control, includes a combination of a third lens 12a and a fourth lens 12b. The second lens unit 12 is moved in the second optical axis segment L2 between a wide-angle position and a telephoto position. The light outgoing from the second lens unit 12 enters the third lens unit 13.

The third lens unit 13 includes a fifth lens fixed to the lens barrel 10. The fourth lens unit 14 including a sixth lens is placed behind the third lens unit 13. An aperture stop 16 capable of regulating the amount of light passing through the lens system is placed between the third lens unit 13 and the fourth lens unit 14. The fourth lens unit 14, serving as a movable lens unit for focusing control, is movable along the second optical axis segment L2. The fifth lens unit 15 including a seventh lens 15a and a correction lens 17, which will be described later, is placed behind the fourth lens unit 14. The seventh lens 15a is fixed to the lens barrel and the correction lens 17 is movably disposed behind the seventh lens 15a. In addition, the imager 18 is placed behind the correction lens 17.

The second lens unit 12 and the fourth lens unit 14 are independently moved along the second optical axis segment L2 such that each optical element is movable between the telephoto position and the wide-angle position. In other words, the second lens unit 12 and the fourth lens unit 14 are moved in opposite directions for telephoto/wide-angle imaging. The second lens unit 12 and the fourth lens unit 14 are moved to the respective telephoto positions or the wide-angle positions to perform zooming control and focusing control. Specifically, upon zooming, the second lens unit 12 and the fourth lens unit 14 are moved from the respective wide-angle positions to the respective telephoto positions, thus performing zooming control. Upon focusing, the fourth lens unit 14 is moved from the wide-angle position to the telephoto position, thus performing focusing control.

The imager 18 is fixed to an imager adapter. The imager 18 is attached to the lens barrel through the imager adapter. An optical filter 19 is placed in front of the imager 18. An image blur correction mechanism 20 having the correction lens 17 is placed between the optical filter 19 and the seventh lens 15a. The image blur correction mechanism 20, which will be described in detail below, corrects a captured image blurred by, for example, a vibration of the lens system. In a normal condition, the correction lens 17 is attached so that the optical axis of the lens 17 coincides with the second optical axis segment L2. When an image formed on the imaging surface of the imager 18 is blurred due to a vibration of the camera body 2, the image blur correction mechanism 20 moves the correction lens 17 in two directions (i.e., a first direction X (yaw direction) and a second direction Y (pitch direction)) orthogonal to the second optical axis segment L2 to correct the image blur on the imaging surface. In the image blur correction mechanism 20, the correction lens 17 alone is placed on the optical axis and guide mechanisms and a driving mechanism for moving the correction lens 17 in the first direction X and the second direction Y are arranged outside, or around the correction lens 17.

(3) Configuration of Image Blur Correction Mechanism

Referring to FIGS. 5 to 8, the image blur correction mechanism 20 includes a stationary member 21, a lens holder member 22 holding the above-described correction lens 17, and a movable member 23 supporting the lens holder member 22. The lens holder member 22 is movable relative to the stationary member 21 in the first direction X and the second direction Y which are orthogonal to each other in a plane orthogonal to the optical axis. The movable member 23 is placed between the stationary member 21 and the lens holder member 22.

Figure 6:
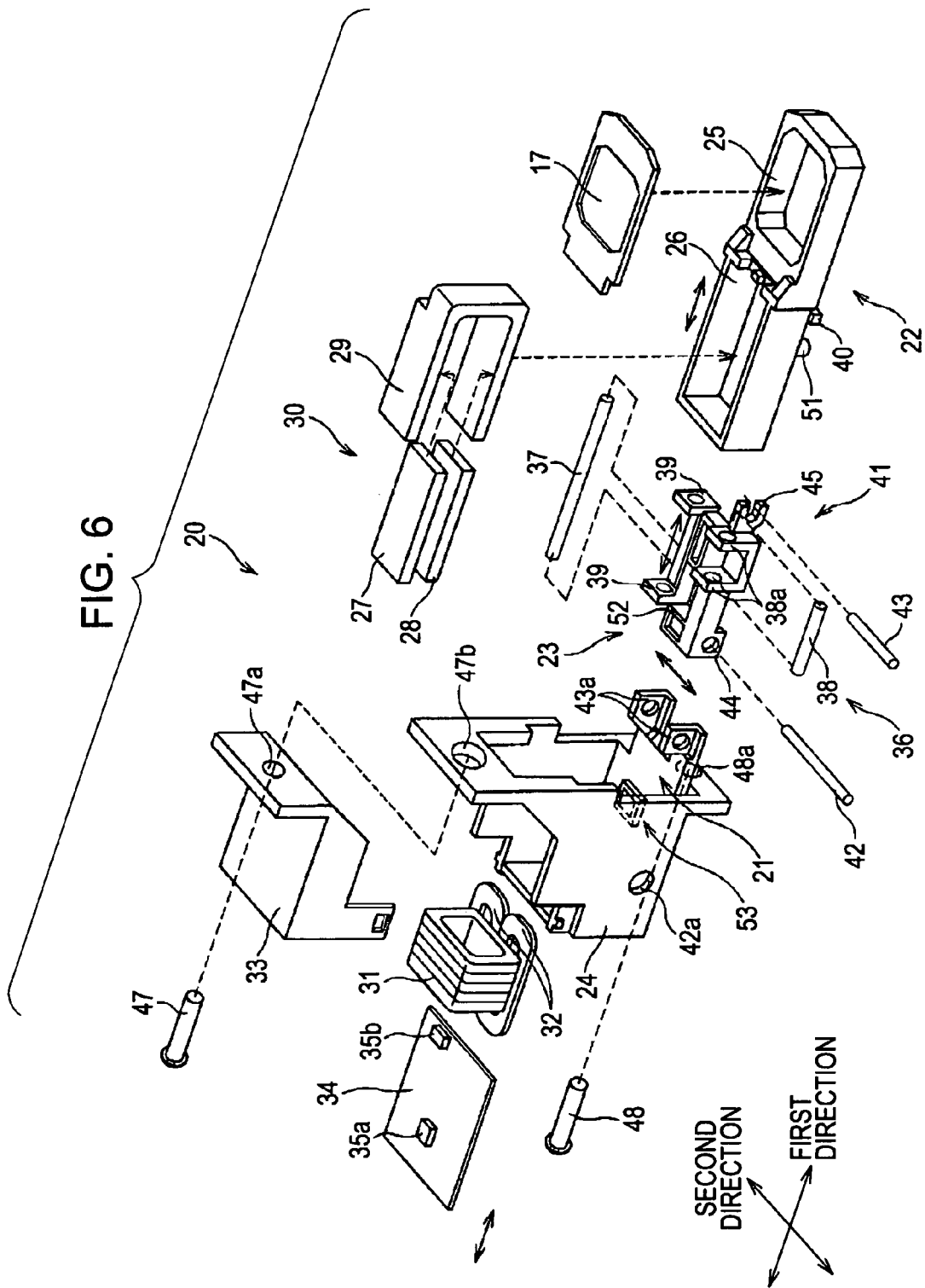
FIG. 6 is an exploded perspective view of the image blur correction mechanism.
Figure 7:
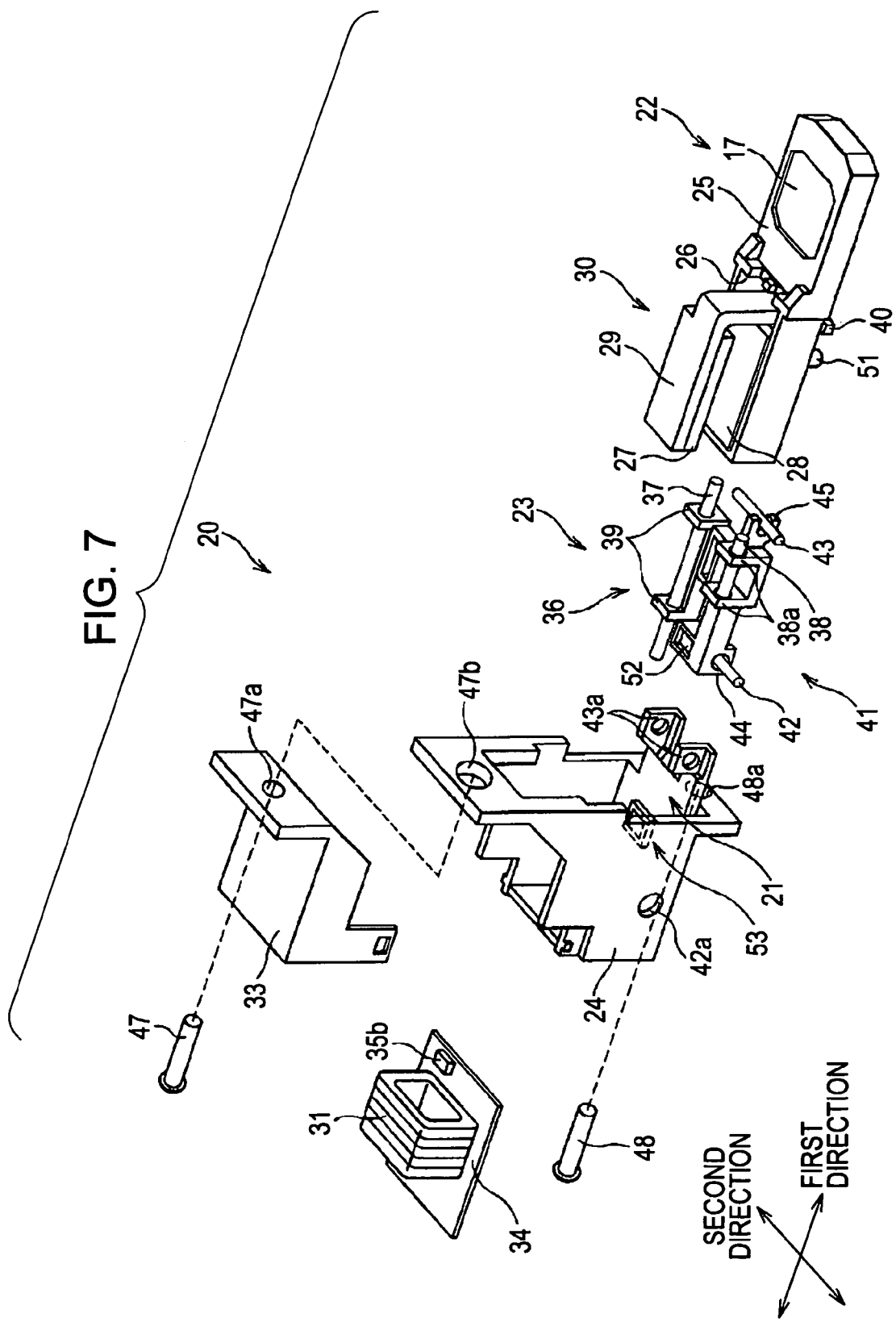
FIG. 7 is an exploded perspective view of the image blur correction mechanism.

Referring to FIGS. 6 and 7, the stationary member 21 is attached to a frame 24. The frame 24 is formed by bending a metal plate so as to have a substantially rectangular cross section. The stationary member 21 is fixed to the bottom of the frame 24 by screws. In addition, the lens holder member 22 is movably disposed above the stationary member 21 and the movable member 23 is movably placed on the stationary member 21. As for the design of the stationary member 21, it is not limited to that fixed to the frame 24. The stationary member 21 may be integrated with the frame 24.

The lens holder member 22, placed above the stationary member 21, has a lens holding portion 25 that holds the correction lens 17 in one end thereof. The lens holding portion 25 is formed as a through hole extending along the thickness of the lens holder member 22. The correction lens 17 is attached to the lens holding portion 25.

The lens holder member 22 has a component placement portion 26 in the other end thereof such that a magnetic circuit is placed in the portion 26. The magnetic circuit constitutes the driving mechanism, indicated at 30, for moving the lens holder member 22 in the first and second directions which are orthogonal to each other.

The magnetic circuit, placed in the component placement portion 26, has magnets 27 and 28 and a yoke 29 to which the magnets 27 and 28 are attached. The yoke 29 is formed in a substantially U-shape. The magnets 27 and 28 are attached to the inner surfaces of opposing parts of the yoke 29 such that the north pole and the south pole of one magnet are opposed to those of the other magnet, respectively. A first coil 31 for generating a propulsive force in the first direction and second coils 32, 32 for generating a propulsive force in the second direction are arranged between the magnets 27 and 28 which are attached to the yoke 29 and are therefore spaced apart from each other.

The first coil 31 and the second coils 32 are disposed on a printed circuit board 34 attached to the frame 24. The first coil 31 acts with a magnetic force generated by the magnets 27 and 28 to produce the propulsive force in the first direction. The first coil 31, rolled in a cylinder, is fixed to one surface of the printed circuit board 34 using an adhesive. The second coils 32, 32 act with a magnetic force generated by the magnets 27 and 28 to produce the propulsive force in the second direction. The second coils 32, each including a flat coil, are fixed to the other surface of the printed circuit board 34 using an adhesive. The second coils 32 are arranged such that straight portions of the coils 32 are parallel to each other and driving currents flow through the adjacent straight portions in the same direction. The driving currents of the second coils 32 act with the magnetic force generated by the magnets 27 and 28 to produce the driving force in the second direction. The printed circuit board 34 having the first coil 31 and the second coils 32 thereon is incorporated in the frame 24 such that the printed circuit board 34 is interposed between the magnets 27 and 28. The second coils 32 may have the same size or different sizes.

The printed circuit board 34 has thereon a first Hall element 35$a$ and a second Hall element 35$b$, serving as position sensors for detecting the amount of movement of the lens holder member 22 in the first direction and that in the second direction. The first and second Hall elements 35$a$ and 35$b$ are disposed so as to face the magnet 27. The first Hall element 35$a$ detects the magnetic force of the magnet 27 and also detects the amount of movement of the lens holder member 22 in the first direction. The second Hall element 35$b$ detects the magnetic force of the magnet 27 and also detects the amount of movement of the lens holder member 22 in the second direction.

Figure 9:
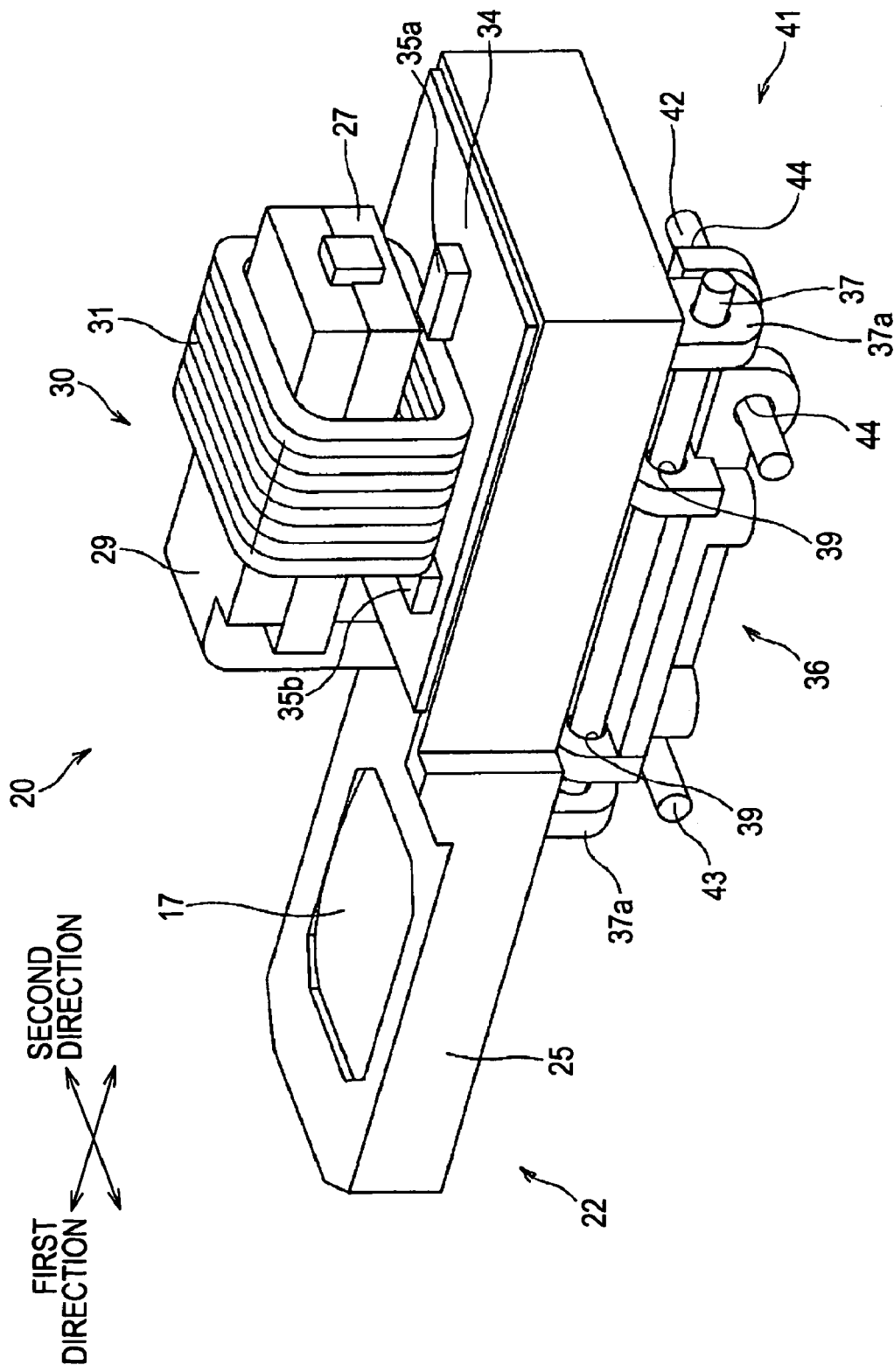
FIG. 9 is a perspective view of the image blur correction mechanism.
Figure 10:
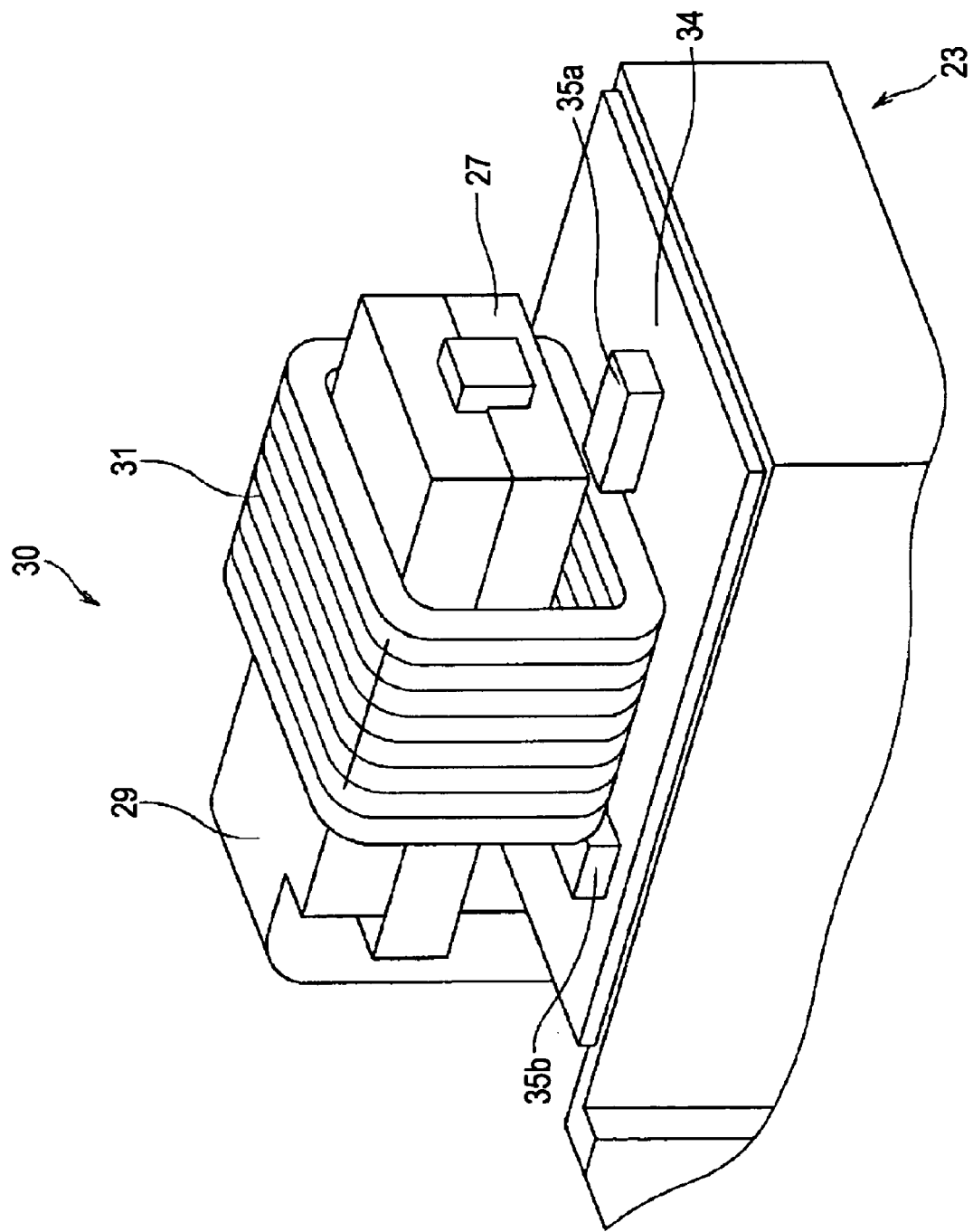
FIG. 10 is a perspective view of a driving mechanism.

As described above, the driving mechanism 30 includes the magnets 27 and 28, the yoke 29, the first coil 31, and the second coils 32. In the driving mechanism 30, as shown in FIGS. 9 and 10, the frame 24, in which the printed circuit board 34 having the first coil 31 and the second coils 32 is incorporated, serves as a stationary portion and the lens holder member 22, in which the magnets 27 and 28 and the yoke 29 are disposed, serves as a movable portion moving in the first and second directions. The driving mechanism 30 is enclosed by a cover 33 attached to the frame 24.

The configuration of the driving mechanism is not limited to the above-described one. For example, the magnets may be arranged on the frame 24 and the coils may be arranged on the lens holder member 22. In addition, the driving mechanism may include a stepping motor, a piezoelectric transducer (PZT), or a linear driving element as a driving source.

As shown in FIG. 9, the movable member 23, interposed between the stationary member 21 and the lens holder member 22, has a first guide mechanism 36 and a second guide mechanism 41. The first guide mechanism 36 for guiding the lens holder member 22 during movement of the lens holder member 22 in the first direction is disposed between the movable member 23 and the lens holder member 22. The second guide mechanism 41 for guiding the lens holder member 22 during movement of the lens holder member 22 in the second direction is disposed between the movable member 23 and the stationary member 21. The movable member 23, serving as a support for supporting the lens holder member 22, is moved relative to the stationary member 21, thus moving the lens holder member 22.

The first guide mechanism 36 includes first guide shafts 37 and 38, first guide holes 39, and a first engagement member 40. The first guide shafts 37 and 38 are arranged in parallel to the first direction. The first guide holes 39 are arranged in the movable member 23 so as to receive the first guide shaft 37. The first engagement member 40 is arranged on the lens holder member 22 so as to be engaged with the other first guide shaft 38.

Figure 8:
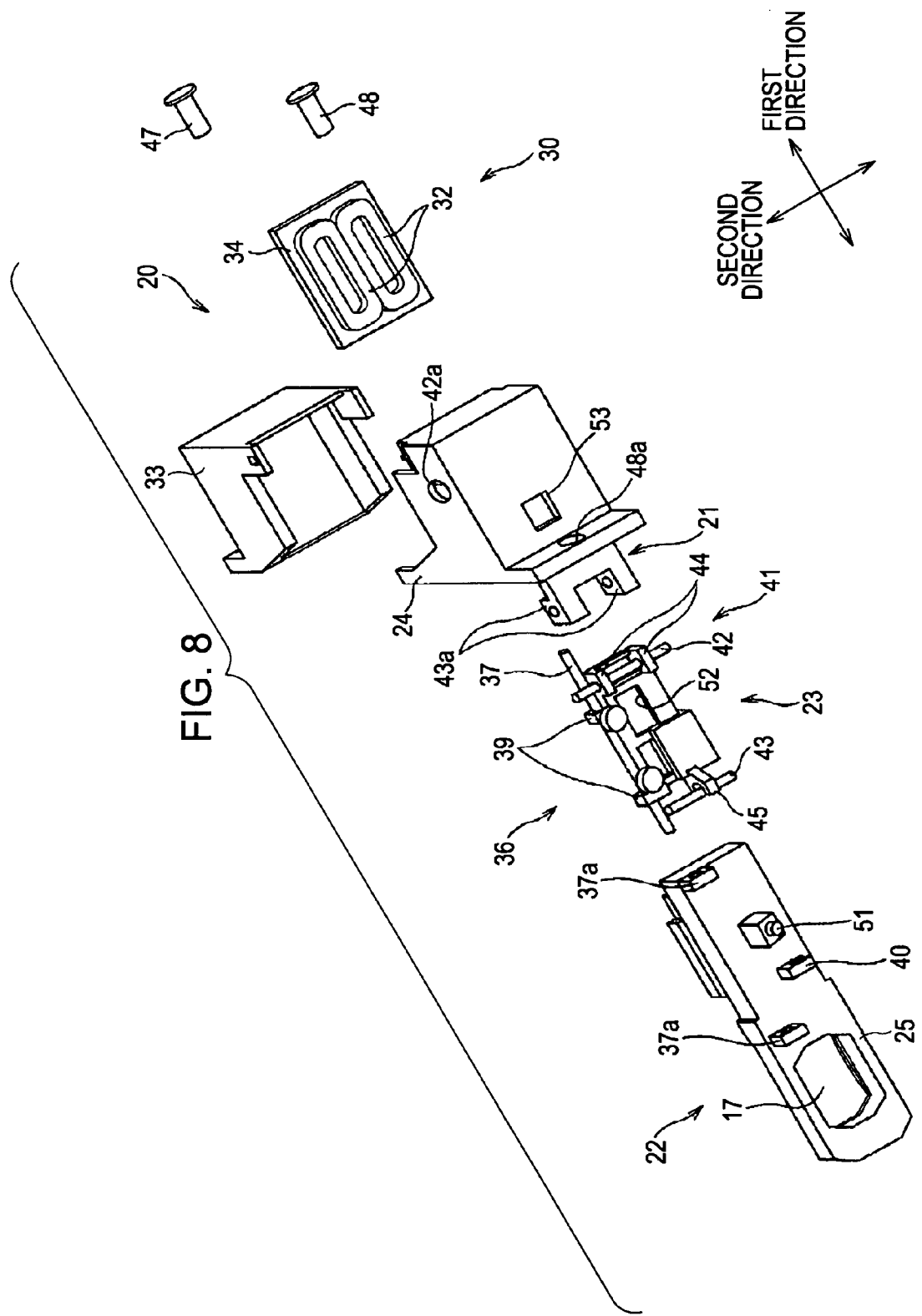
FIG. 8 is an exploded perspective view of the image blur correction mechanism as viewed from the side opposite to the side in FIGS. 6 and 7.

The first guide shaft 37 serves as a main shaft. Both ends of the shaft 37 are supported by support members 37$a$, 37$a$ arranged on the lens holder member 22. As shown in FIGS. 6 to 8, the first guide shaft 37, serving as the main shaft, is placed in the first guide holes 39 in the movable member 23. The other first guide shaft 38 serves as an auxiliary shaft relative to the first guide shaft 37, serving as the main shaft, and is shorter than the first guide shaft 37. Both ends of the first guide shaft 38 are supported by support members 38$a$, 38$a$ arranged in the movable member 23. The first guide shaft 38 is engaged with the first engagement member 40 having a U-shaped form on the lens holder member 22.

The second guide mechanism 41 includes second guide shafts 42 and 43, second guide holes 44, and a second engagement member 45. The second guide shafts 42 and 43 are arranged in parallel to the second direction. The second guide holes 44 are arranged in the movable member 23 so as to receive the second guide shaft 42. The second engagement member 45 is placed on the movable member 23 so as to be engaged with the other second guide shaft 43.

The second guide shaft 42 serves as a main shaft. Both end portions 42$b$, 42$b$ of the shaft 42 are supported by support holes 42$a$, 42$a$ which are arranged on both side surfaces of the frame 24, respectively. As shown in FIGS. 6, 8, and 9, the second guide shaft 42, serving as the main shaft, is inserted and fixed in the second guide holes 44 in the movable member 23. The other second guide shaft 43 serves as an auxiliary shaft relative to the second guide shaft 42, serving as the main shaft, and is shorter than the second guide shaft 42. Both ends of the second guide shaft 43 are supported by support members 43$a$, 43$a$ arranged in the stationary member 21. The second guide shaft 43 is engaged with the second engagement member 45 having a U-shaped form on the movable member 23.

Referring to FIGS. 5, 11A, 11B, 12A, and 12B, the support holes 42$a$, 42$a$, serving as support portions supporting the second guide shaft 42, each include a first hole segment 61 having a large diameter, a second hole segment 62 having a small diameter, and a slide hole segment 63 such that the first hole segment 61 is located adjacent to the outer surface of the frame 24, the first hole segment 61 is continuous with the second hole segment 62, and the slide hole segment 63 is located adjacent to the inner surface of the frame 24. The first hole segment 61 and the second hole segment 62 of each support hole 42$a$ are holes for receiving a jig for incorporating the second guide shaft 42 through the frame 24 into the movable member 23 upon, for example, assembly of the image blur correction mechanism 20. The slide hole segment 63 is a slide hole in which the second guide shaft 42 is inserted and slid. The diameter of the slide hole segment 63 is substantially the same as that of the second guide shaft 42. The slide hole segments 63, 63 are formed so that the direction in which the respective centers of the slide hole segments 63 are connected coincides with the direction in which the second guide shaft 42 is slid, namely, the second direction. The support holes 42$a$, 42$a$ are not limited to the slide hole segments 63, 63. Each support hole 42$a$ may be, for example, a U-shaped notch.

Figure 11A:
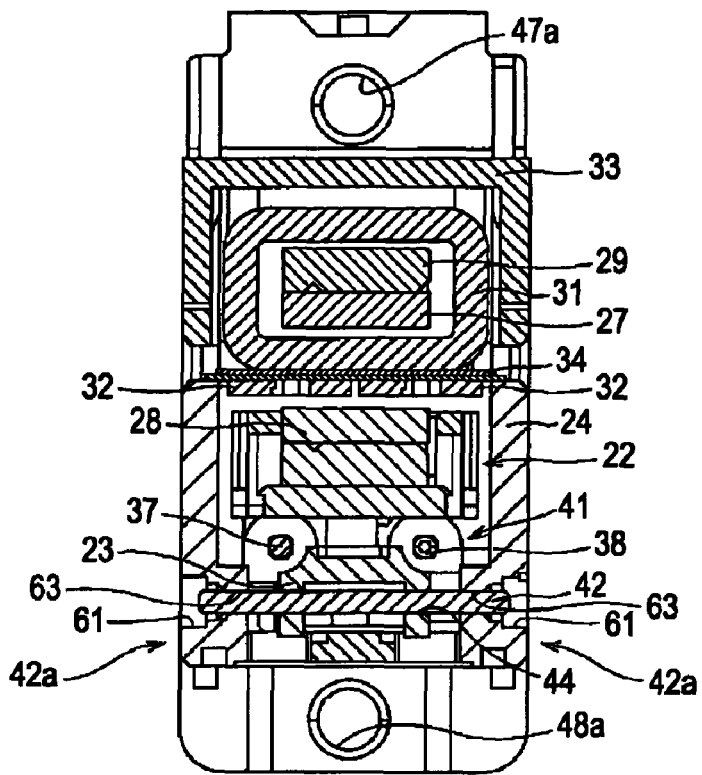
FIG. 11A is a longitudinal sectional view, taken along a second guide shaft, of the image blur correction mechanism, FIG. 11A explaining support portions supporting the second guide shaft.
Figure 11B:
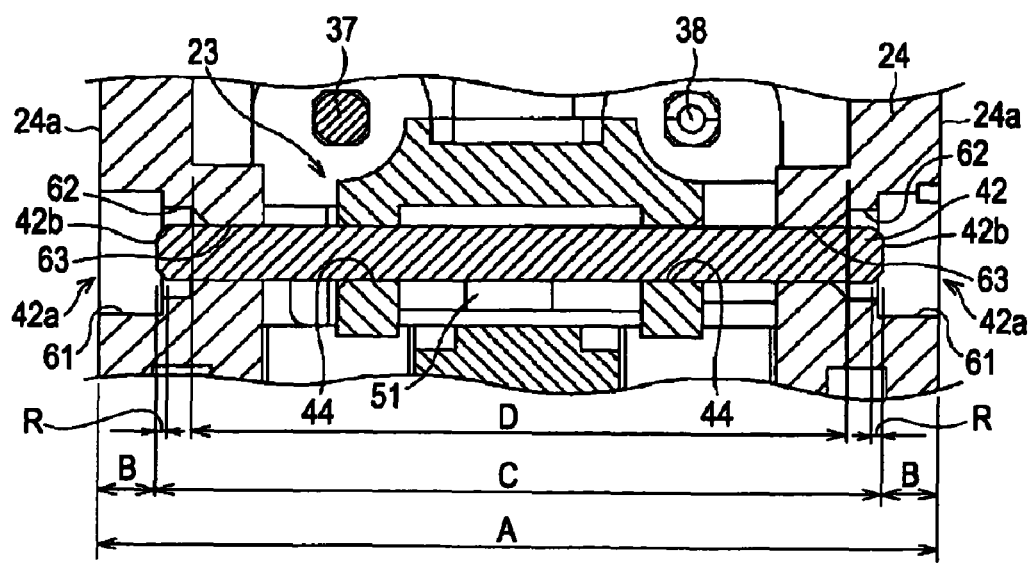
FIG. 11B is an enlarged view of substantial part of the image blur correction mechanism of FIG. 11A.

Referring to FIG. 11B, the frame 24 has outer side surfaces 24$a$, 24$a$ having the support holes 42$a$, 42$a$, respectively. When let C denote the axial length of the second guide shaft 42, let A denote the distance between the opposed outer side surfaces 24$a$, 24$a$, and let B denote the length of image blur correction stroke (hereinafter, "image blur correction stroke length") of the second guide shaft 42, the relationship of A−2B>C is satisfied. In other words, a maximum length of the second guide shaft 42 is substantially (A−2B) in consideration of a distance in which the second guide shaft 42 is movable inside the frame 24 for image blur correction.

The image blur correction stroke length is the distance in which the second guide shaft 42 is movable toward one outer side surface 24a of the frame 24 in order to correct an image blur when the second guide shaft 42 is located inside the frame 24 such that both the ends of the shaft 42 are spaced from the respective outer side surfaces 24a by the same amount. Specifically, the distance in which the second guide shaft 42 is movable is twice the image blur correction stroke length. The image blur correction stroke length is determined by the amount of restriction by a restriction protrusion 51 of the movable member 23. The restriction protrusion 51 will be described later.

When let D denote the distance between the outermost ends of the slide hole segments 63, 63, the support holes 42a, 42a supporting the second guide shaft 42 are formed so that the relationship of D<A−4B is satisfied. In other words, a maximum distance between the slide hole segments 63, 63 supporting the second guide shaft 42 is substantially (A−4B).

In addition, both the end portions 42b, 42b of the second guide shaft 42 are rounded off during manufacture. Accordingly, the diameter of each end portion 42b is different from that of the second guide shaft 42. A variation in length of the rounded part of each end portion 42b of the second guide shaft 42 may also cause an error in the direction in which the second guide shaft 42 moves. Let R denote the allowable length of the rounded part. When the allowable length R is taken into consideration, the distance D between the outermost ends of the slide hole segments 63, 63 satisfies the relationship of D<A−4B−2R. In other words, when the allowable length R in each end portion 42b is taken into consideration, the maximum distance between the outermost ends of the slide hole segments 63, 63 supporting the second guide shaft 42 is substantially (A−4B−2R).

Figure 5:
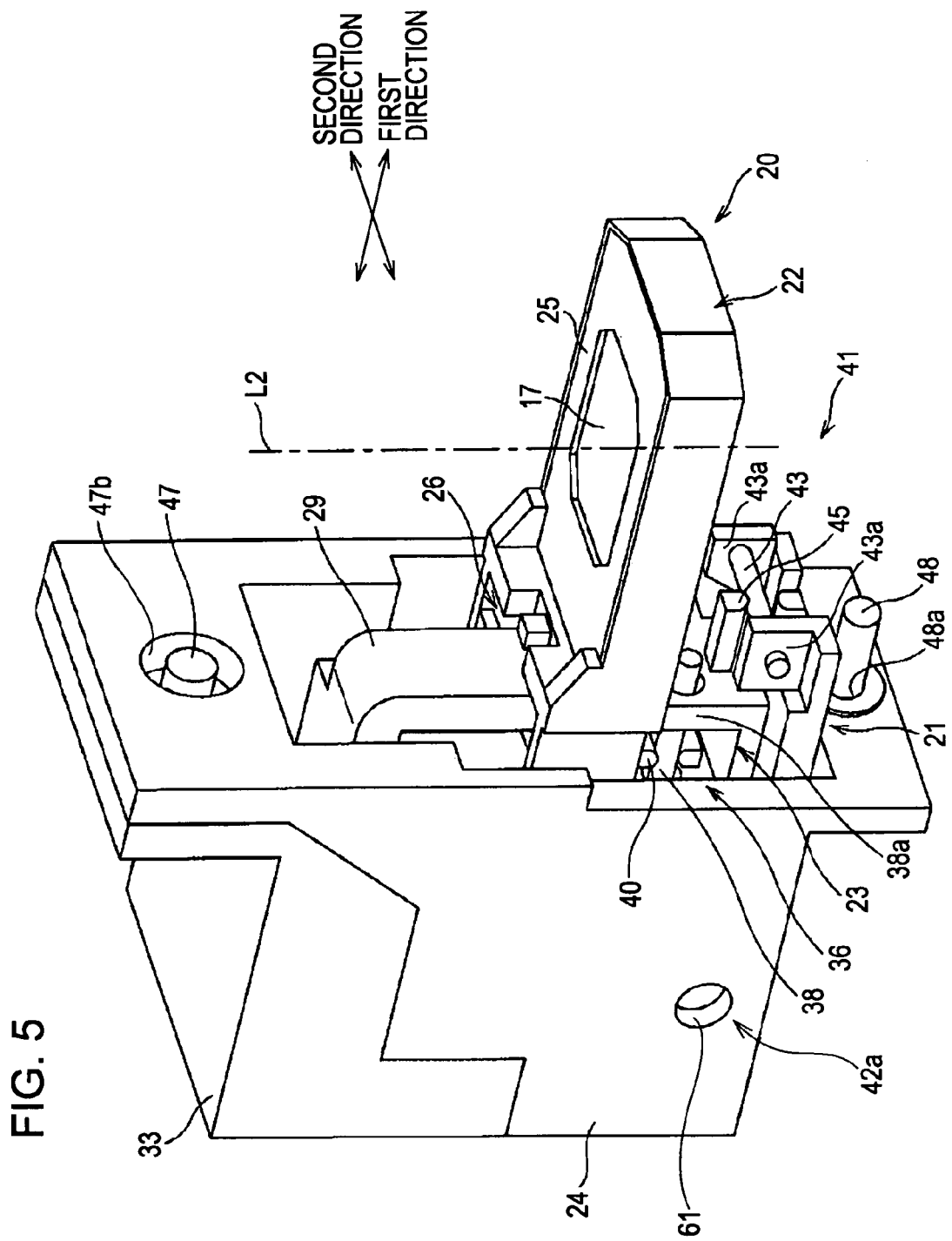
FIG. 5 is a perspective view of an image blur correction mechanism.

Referring to FIGS. 5 and 13, when the image blur correction mechanism 20 is incorporated into the lens barrel, only the correction lens 17 held by the lens holding portion 25 of the lens holder member 22 is located on the optical axis such that the other components, i.e., the driving mechanism 30, the first guide mechanism 36, and the second guide mechanism 41 are arranged outside the lend holding portion 25, namely, on the opposite side of the lens holder member 22 from the lend holding portion 25 in the longitudinal direction thereof (the first direction). Accordingly, the image blur correction mechanism 20 can be reduced in thickness in the second optical axis segment L2 along which the lenses are arranged. In addition, the midpoint O (refer to FIG. 13) between the first coil 31 and the two adjacent second coils 32 constituting the driving mechanism 30, i.e., the center of the driving mechanism for generating the propulsive forces in the first and second directions is located so as to substantially coincide with the center of an area surrounded by the first guide shafts 37 and 38 of the first guide mechanism 36 and the second guide shafts 42 and 43 of the second guide mechanism 41. Accordingly, in the image blur correction mechanism 20, a portion for generating the driving forces in the first and second directions is close to the positions of the first guide shafts 37 and 38 and the second guide shafts 42 and 43, thus reducing the propulsive forces (driving forces) used for movement in the first and second directions. Advantageously, power saving can be achieved.

In the image blur correction mechanism 20, the slide hole segments 63, 63 of the support holes 42a, 42a restricting the direction in which the second guide shaft 42 moves are disposed outside the second guide holes 44, 44, arranged in the movable member 23 holding the second guide shaft 42, in the axial direction of the second guide shaft 42. As for the positions of the slide hole segments 63, 63 of the support holes 42a, 42a, serving as the members restricting the guiding direction, therefore, when the slide hole segments 63, 63 are spaced apart from each other, effects due to variations in dimensions of the slide hole segments 63, 63 during manufacture are small. In addition, so long as the axial length C of the second guide shaft 42 is (A−2B) and the distance D between the outermost ends of the slide hole segments 63, 63 of the support holes 42a, 42a is (A−4B) in the image blur correction mechanism 20, the high-accuracy image blur correction mechanisms 20 to be incorporated into the respective frames 24 having the same size can be easily manufactured.

The first guide mechanism 36 and the second guide mechanism 41 are mounted into the frame 24 incorporated with the stationary member 21, the lens holder member 22 in which the movable member 23 and the magnetic circuit are arranged in the component placement portion 26 is mounted into the frame 24, the driving mechanism 30 is covered with the cover 33, and after that, a screw 47 is inserted into an insertion hole 47a in the cover 33 and an insertion hole 47b in the frame 24, so that the image blur correction mechanism 20 is fastened to a frame of the lens barrel with this screw. A screw 48 is inserted into an insertion hole 48a in the frame 24, so that the frame 24 is fastened to the frame of the lens barrel with this screw.

Referring to FIG. 8, the lens holder member 22 has the restriction protrusion 51 on its surface which faces the stationary member 21 such that the restriction protrusion 51 is located in an area surrounded by the first guide mechanism 36 and the second guide mechanism 41. The restriction protrusion 51 restricts the amount of movement of the lens holder member 22 in the first and second directions. The restriction protrusion 51 is inserted into a through hole 52 in the movable member 23 and is then received in a restriction hole 53 in the stationary member 21. Although the lens holder member 22 is moved in the first and second directions by the driving mechanism 30, the restriction protrusion 51 on the lens holder member 22 is come into contact with the inner surface of the restriction hole 53 to restrict the movement of the member 22 in each direction.

An operation of the image blur correction mechanism 20 with the above-described configuration will be described below. When the driving mechanism 30 is not activated, the correction lens 17 in the lens holder member 22 is located in a midpoint position that coincides with the optical axis.

To move the lens holder member 22 from this midpoint position to one side in the first direction, a driving current flowing in one direction is supplied to the first coil 31 in the driving mechanism 30. Thus, the driving mechanism 30 generates a propulsive force allowing the lens holder member 22 to move toward the one side in the first direction by using the action of the driving current flowing in the one direction with a magnetic force generated through the magnets 27 and 28. In this instance, the movable member 23 is not moved relative to the stationary member 21 in the first direction by the second guide mechanism 41. The lens holder member 22 is therefore moved relative to the movable member 23 integrated with the stationary member 21 in the one direction while being guided by the first guide mechanism 36. To move the lens holder member 22 to the other side in the first direction, a driving current flowing in the opposite direction may be supplied to the first coil 31.

To move the lens holder member 22 from the midpoint position to one side in the second direction, a driving current flowing in one direction is supplied to each of the second coils 32, 32 in the driving mechanism 30. Thus, the driving mechanism 30 generates a propulsive force allowing the lens holder member 22 to move to the one side in the second direction by using the action of the driving currents flowing in the one direction with a magnetic force generated through the magnets 27 and 28. In this instance, the lens holder member 22 is not moved relative to the movable member 23 in the second direction by the first guide mechanism 36. Consequently, the lens holder member 22 is moved to the one side in the second direction while being integrated with the movable member 23 and being guided by the second guide mechanism 41.

Figure 12A:
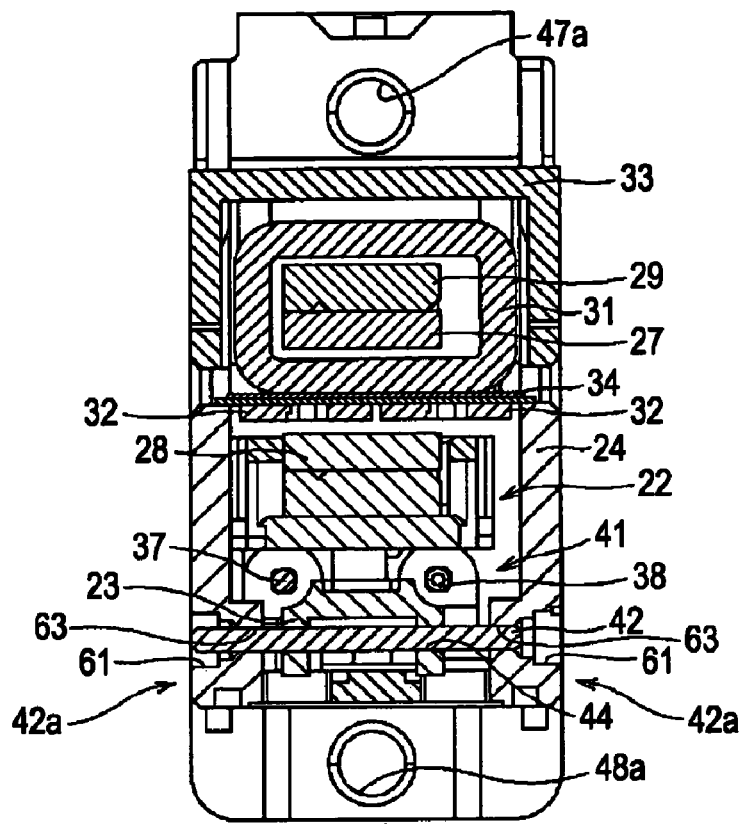
FIG. 12A is a longitudinal sectional view of the image blur correction mechanism, FIG. 12A illustrating a state in which a movable member and a lens holder member are moved in one side of a second direction.
Figure 12B:
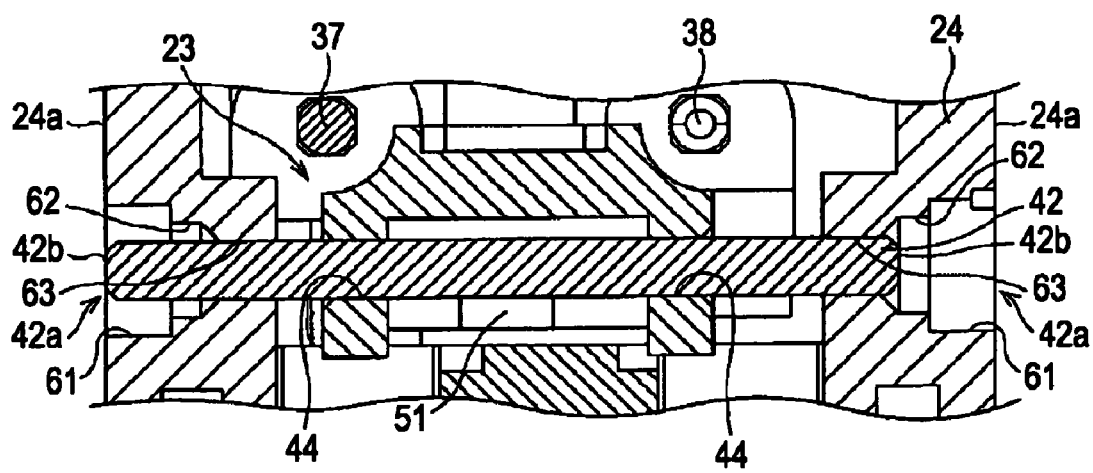
FIG. 12B is an enlarged view of substantial part of the image blur correction mechanism of FIG. 12A.

As for the movement of the lens holder member 22 in the second direction, when the driving mechanism 30 is not activated, the correction lens 17 in the lens holder member 22 is located in the midpoint position that coincides with the optical axis as shown in FIGS. 11A and 11B. At that time, the second guide shaft 42 is located inside the frame 24 such that both the ends of the shaft 42 are spaced from the respective outer side surfaces 24a by substantially the same amount in the second direction. Specifically, the end portions 42b, 42b of the second guide shaft 42 are spaced from the respective outer side surfaces 24a, 24a of the frame 24 by substantially the stroke length B. When the driving mechanism 30 is activated, the lens holder member 22 is moved in the second direction while being integrated with the movable member 23 by the first guide mechanism 36 as shown in FIGS. 12A and 12B. At that time, the second guide shaft 42 can be moved by the maximum stroke length B. When the second guide shaft 42 is moved only by the maximum stroke length B, therefore, one end portion 42b of the second guide shaft 42 is moved up to a position where the end portion 42b is substantially flush with the corresponding outer side surface 24a of the frame 24. In other words, the second guide shaft 42 does not protrude from the outer side surface 24a of the frame 24. Accordingly, when the lens barrel including the image blur correction mechanism 20 is incorporated into the camera body, the arrangement and design of components in the vicinity of the lens barrel can be easily made. To move the lens holder member 22 to the other side in the second direction, a driving current flowing in the opposite direction may be supplied to each of the second coils 32, 32. The movement of each end portion 42b of the second guide shaft 42 is not limited to that up to the position where the end portion 42b is substantially flush with the corresponding outer side surface 24a of the frame 24. The end portion 42b may be moved to a predetermined position inside the corresponding outer side surface 24a of the frame 24.

In the use of the image blur correction mechanism 20 with the above-described configuration, since the first guide mechanism 36 and the second guide mechanism 41 are not arranged around the lens holding portion 25, which holds the correction lens 17, of the lens holder member 22 and only the correction lens 17 is located in the optical path, the lens barrel can be reduced in thickness and size. Furthermore, since the slide hole segments 63, 63 of the respective support holes 42a, 42a supporting the second guide shaft 42 are spaced apart from each other, a tolerance in the direction in which the centers of the slide hole segments 63, 63 are connected to each other, namely, the second direction is provided larger than that in the case where the slide hole segments 63, 63 are close to each other. Accordingly, high-accuracy correction can be easily achieved. In addition, since the low profile of the image blur correction mechanism 20 can be achieved reasonably in configuration, a stray light component is prevented from entering the optical path to cause a ghost image.

The positions of the support holes 42a, 42a for the second guide shaft 42, guiding the movement of the lens holder member 22 in the second direction, in the frame 24 in the image blur correction mechanism 20 have been described above. As for the first guide mechanism 36 guiding the movement of the lens holder member 22 in the first direction, support portions supporting the guide shaft may be spaced apart from each other to achieve high-accuracy correction in a manner similar to the above.

(4) Circuit Configurations of Camera and Image Blur Correction Mechanism

Figure 14:
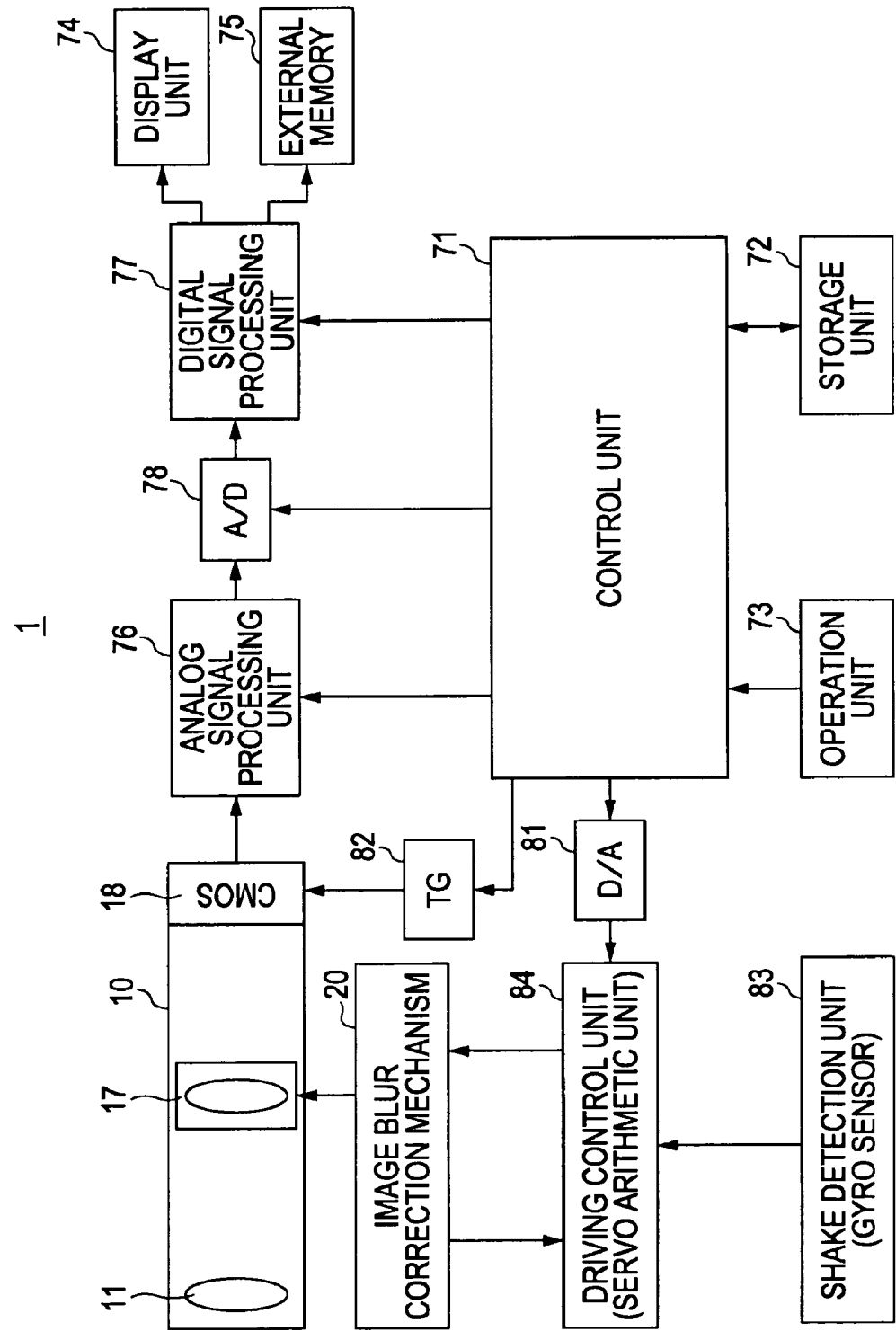
FIG. 14 is a block diagram of the circuit configuration of the camera.

FIG. 14 is a block diagram of the camera 1 including the above-described image blur correction mechanism 20. The camera 1 includes a control unit 71, a storage unit 72, an operation unit 73, a display unit 74, and an external memory 75. The control unit 71 controls an operation of the entire lens barrel including the image blur correction mechanism 20. The storage unit 72 includes a program memory and a data memory for driving the control unit 71, a RAM, and a ROM. The operation unit 73 receives various instruction signals for power on/off, imaging mode selection, and imaging. The display unit 74 displays a captured image. The external memory 75 increases the storage capacity.

The control unit 71 includes an arithmetic circuit including, for example, a microcomputer (CPU). The control unit 71 is connected to the storage unit 72, the operation unit 73, an analog signal processing unit 76, a digital signal processing unit 77, an analog-to-digital (A/D) converter 78, a digital-to-analog (D/A) converter 81, and a timing generator (TG) 82. The analog signal processing unit 76, which is connected to the imager 18, performs predetermined signal processing in accordance with an analog signal corresponding to a captured image output from the imager 18. The analog signal processing unit 76 is connected to the A/D converter 78, which converts a signal output of the analog signal processing unit 76 into digital form.

The D/A converter 81 is connected to a driving control unit 84 for performing servo arithmetic operation for image blur correction. The driving control unit 84 drives the image blur correction mechanism 20 in accordance with a position of the correction lens 17 to correct an image blur. The driving control unit 84 is connected to the first Hall element 35a and the second Hall element 35b, serving as the position sensors that detect the magnetic force of the magnets 27 and 28 attached to the lens holder member 22 of the driving mechanism 30 in the image blur correction mechanism 20 to detect the position of the lens holder member 22 in the first direction and that in the second direction. The TG 82 is connected to the imager 18.

When an image of a subject is formed on the imaging surface of the imager 18 through the lens system, the imager 18 outputs an image signal in analog form, the analog signal processing unit 76 performs predetermined processing on the analog signal, and after that, the A/D converter 78 converts the analog signal into a digital signal. The digital signal processing unit 77 performs predetermined processing on the digital signal output from the A/D converter 78. After that, the resultant signal is displayed as an image corresponding to the subject on the display unit 74. Alternatively, the signal is stored as information into the external memory 75.

In such an imaging mode, the image blur correction mechanism 20 is in an active state. When the camera body 2 is shaken or stirred, a gyro sensor 83 detects the shake or stir and outputs a detection signal to the driving control unit 84. The driving control unit 84 supplies predetermined driving signals as driving currents to the first coil 31 and the second coils 32 of the driving mechanism 30 in the image blur correction mechanism 20, thus moving the lens holder member 22 relative to the stationary member 21 in the first and second directions. Consequently, the correction lens 17 is moved to eliminate an image blur, so that a clear image can be obtained.

Figure 15:
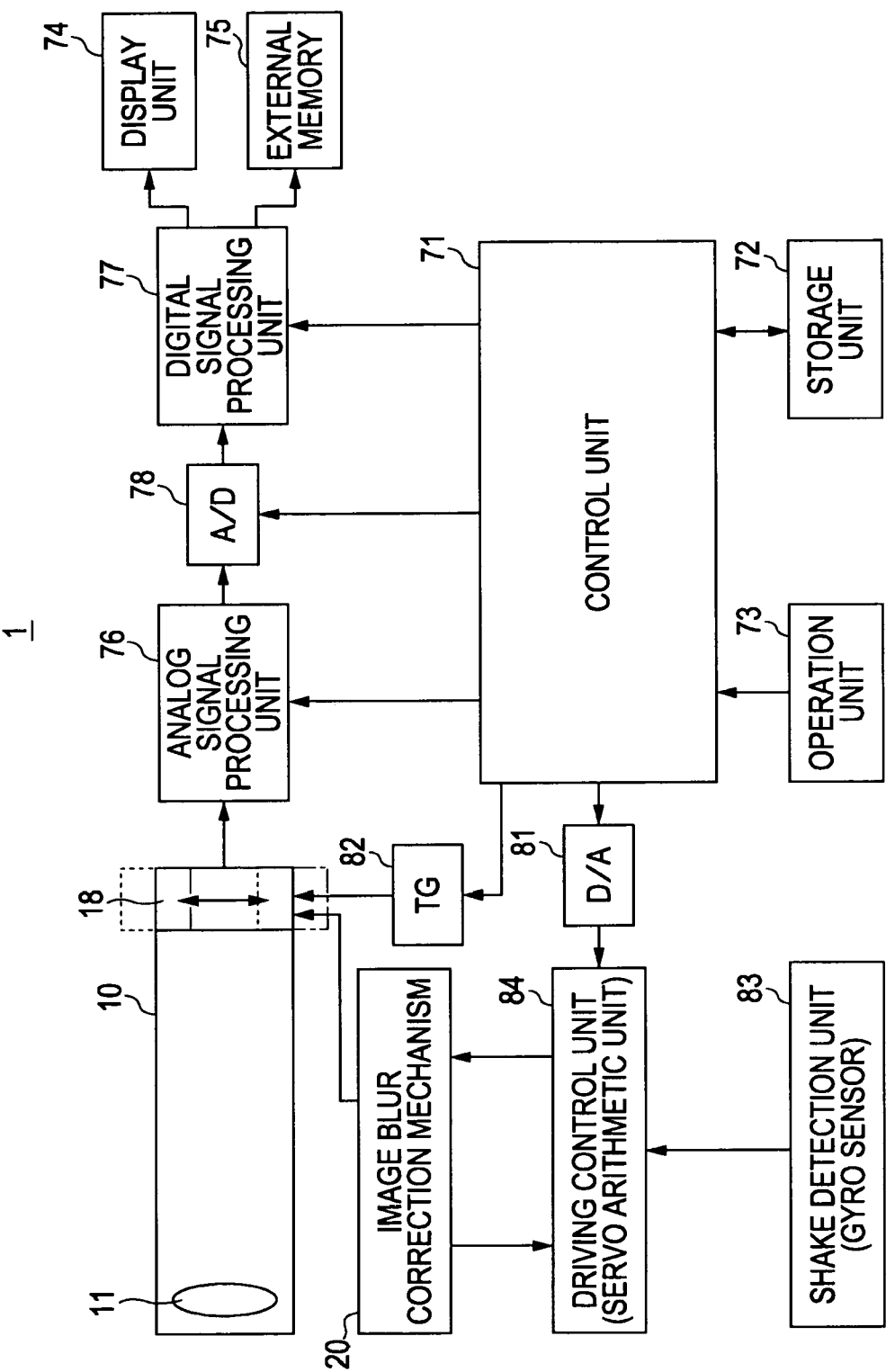
FIG. 15 is a block diagram of another circuit configuration of the camera.

As described above, in the embodiment, the image blur correction mechanism 20 for moving the correction lens 17 disposed above the imager 18 is provided to correct an image blur. The image blur correction mechanism 20 may be provided for the imager 18 as shown in FIG. 15. In this case, the lens holder member 22 in the image blur correction mechanism 20 holds the imager 18 instead of the correction lens 17. The correction lens 17 is omitted in the lens barrel.

The circuit configuration of the driving control unit 84 for controlling the image blur correction mechanism 20 will be described below.

Referring to FIG. 16, the driving control unit 84 includes an image blur correction arithmetic section 91, an analog servo section 92, a driving circuit section 93, and four amplifiers 94a, 94b, 95a, and 95b. The image blur correction arithmetic section 91 is connected through the first amplifier (AMP) 94a to a first gyro sensor element 83a and is also connected through the second amplifier (AMP) 94b to a second gyro sensor element 83b.

The first gyro sensor element 83a detects an amount of shift of the camera body 2 in the first direction due to a hand shake applied to the camera body 2. The second gyro sensor element 83b detects an amount of shift of the camera body 2 in the second direction due to a hand shake applied to the camera body 2. This embodiment has been described with respect to the case where the two gyro sensor elements are arranged to individually detect amounts of shift in the first and second directions. A single gyro sensor element may be used to detect amounts of shift in two directions, i.e., the first and second directions.

The image blur correction arithmetic section 91 is connected to the analog servo section 92. The analog servo section 92 converts a digital value calculated through the image blur correction arithmetic section 91 into analog form and outputs a control signal corresponding to the analog value. The analog servo section 92 is connected to the driving circuit section 93. The driving circuit section 93 is connected through the third amplifier (AMP) 95a to the first Hall element 35a serving as the first position sensor and is also connected through the fourth amplifier (AMP) 95b to the second Hall element 35b serving as the second position sensor. The driving circuit section 93 is further connected to the first coil 31 and the second coils 32 in the driving mechanism 30.

A signal indicating an amount of shift of the lens holder member 22 in the first direction detected through the first Hall element 35a is input to the driving circuit section 93 through the third amplifier 95a. A signal indicating an amount of shift of the lens holder member 22 in the second direction detected through the second Hall element 35b is input to the driving circuit section 93 through the fourth amplifier 95b. To move the correction lens 17 or the imager 18 on the basis of those input signals and a control signal supplied from the analog servo section 92 so as to correct an image blur, the driving circuit section 93 supplies a predetermined driving current to either or each of the first coil 31 and the second coils 32.

(5) Modification

The above-described embodiment of the present invention has been described with respect to the case where the lens holder member 22 is moved relative to the stationary member 21 through the movable member 23 and the first and second guide mechanisms 36 and 41 including the shafts in the image blur correction mechanism 20. In the image blur correction mechanism 20, the movable member 23 may be integrated with the frame 24.

Figures 17A, 17B:
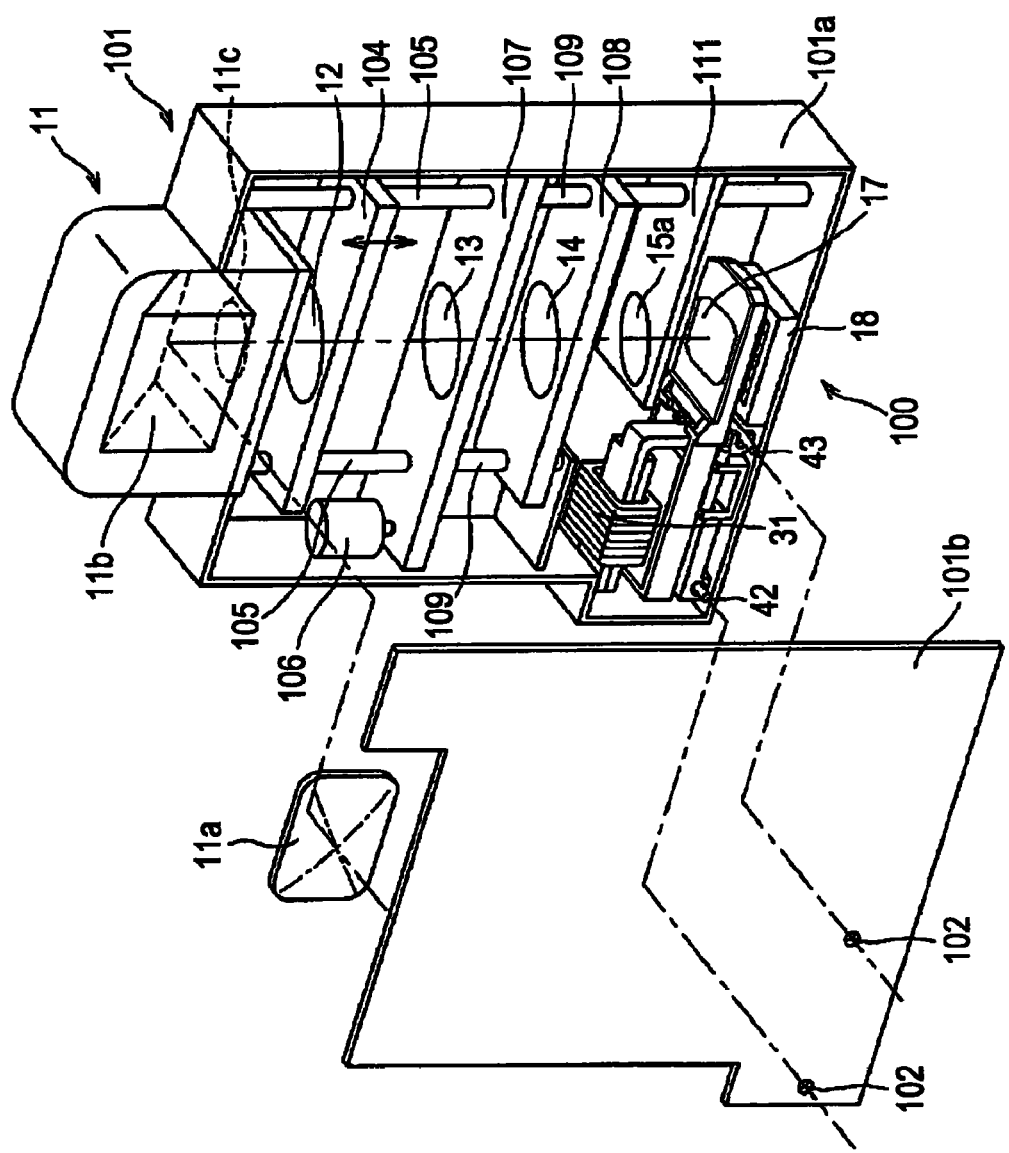
FIG. 17A is an exploded perspective view of an image blur correction mechanism according to a modification of the embodiment.
FIG. 17B is an enlarged cross-sectional view of a support hole.

FIG. 17A illustrates an image blur correction mechanism 100 according to a modification of the embodiment of the present invention. The image blur correction mechanism 100 includes a frame 101 but does not include the stationary member 21. The frame 101 includes a casing 101a and a cover 101b and serves as the body frame of a lens barrel. In the casing 101a of the frame 101, for example, lens units 11 to 15, which have been described with reference to FIG. 4, are arranged.

The cover 101b and the casing 101a of the frame 101 each have support holes 102, 102, which support second guide shafts 42, 43 of a second guide mechanism 41, respectively. Referring to FIG. 17B, the support holes 102, 102 have the same shape as the support holes 42a, 42a of the image blur correction mechanism 20. The support holes 102, 102 each have a slide hole segment 103 in which the second guide shaft 42 is slid.

Referring to FIG. 17A, the frame 101, in which the image blur correction mechanism 100 is mounted, holds the lens units 11 to 15 and an imager 18. As for the five lens units 11 to 15, the first lens unit 11 is placed on the front side. The first lens unit 11 includes a first lens 11a, serving as an objective lens, a prism 11b bending the optical axis at substantially 90 degrees, and a second lens 11c. The first lens unit 11 is attached to the frame 101.

The second lens unit 12, serving as a movable lens unit for zooming control, is held by a second-lens-unit holding frame 104. The second-lens-unit holding frame 104 is guided by a pair of guide shafts 105, 105. The guide shafts 105, 105 are connected to a second-lens-unit driving unit 106, which moves the second lens unit 12 along the optical axis between a wide-angle position and a telephoto position. The light outgoing from the second lens unit 12 enters the third lens unit 13.

The third lens unit 13 is held by a third-lens-unit holding frame 107 fixed to the frame 101. The fourth lens unit 14 is placed behind the third lens unit 13. The fourth lens unit 14, serving as a movable lens unit for focusing control, is held by a fourth-lens-unit holding frame 108. The fourth-lens-unit holding frame 108 is moved along the optical axis between a telephoto position and a wide-angle position while being guided by a pair of guide shafts 109, 109. The light outgoing from the fourth lens unit 14 enters the fifth lens unit 15.

The fifth lens unit 15 includes a lens 15a held by a lens holding frame 111 fixed to the frame 101 and a correction lens 17 in the image blur correction mechanism 100. The light outgoing from the fifth lens unit 15 reaches the imager 18 placed behind the fifth lens unit 15.

As described above, the lens units 11 to 15 constituting parts of a lens system and the imager 18 are incorporated in the frame 101. Specifically, the first lens unit 11, the second lens unit 12, the third lens unit 13, and the fourth lens unit 14 are incorporated in the casing 101a. In addition, the lens 15a of the fifth lens unit 15 and the image blur correction mechanism 100 moving the correction lens 17 in the directions orthogonal to the optical axis are incorporated in the casing 101a. Since the cover 101b of the frame 101 covers the casing 101a, the support holes 102, 102 support the second guide shafts 42 and 43 of the image blur correction mechanism 100, respectively, thus assembling the lens barrel. One end of the second guide shaft 42 and that of the second guide shaft 43 in the image blur correction mechanism 100 are supported by the support holes 102, 102 of the cover 101b, respectively. The other end of the second guide shaft 42 and that of the second guide shaft 43 are supported by the support holes (not illustrated) in the casing 101a, respectively, the support holes being the same as the support holes 102, 102.

The image blur correction mechanism 100 is placed together with the lens units 11 to 15 in the frame 101. The number of components of the lens barrel can be reduced. In addition, the lens barrel can be reduced in thickness and size.

The digital still cameras according to the embodiment and modification of the present invention have been described.

The present invention may be applied to a digital video camera and may also be applied to a still camera using a silver halide film.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction unit comprising:
a holder member holding either an imager or a lens that constitutes a part of a lens system, the holder member being movable in a straight line on a plane orthogonal to an optical axis of the lens system;
a movable member attached to a frame that serves as an outermost component, the movable member supporting the holder member;
a guide member guiding movement of the holder member relative to the frame; and
a driving section driving the holder member, wherein
the guide member includes a guide shaft fixed to the movable member and supported by a first support portion and a second support portion provided in the frame,
the guide shaft being fixed to the movable member at a first hole and a second hole located in the moveable member,
the first support portion and the second support portion of the frame being respectively located outside the first hole and the second hole of the movable member such that a distance between the first support portion and the second support portion of the frame is greater that a distance between the first hole and the second hole of the movable member, and
the movable member moves relative to the frame while being integrated with the guide shaft.

2. The unit according to claim 1, wherein the first and second support portions include slide holes in which both end portions of the guide shaft are slid, respectively.

3. The unit according to claim 2, wherein the axial length of the guide shaft is less than a value obtained by subtracting a distance in which the guide shaft is movable from a distance between the opposite outer surfaces of the frame.

4. The unit according to claim 2, wherein a maximum distance between outermost ends of the first and second support portions provided near respective end portions of the guide shaft is less than a value obtained by subtracting a distance in which the guide shaft is movable, a value of the end portion of the guide shaft, and the value of the other end portion thereof from the distance between the opposite outer surfaces of the frame.

5. A lens barrel device comprising:
a holder member holding either an imager or a lens that constitutes a part of a lens system, the holder member being movable in a straight line on a plane orthogonal to an optical axis of the lens system;
a movable member attached to a frame that serves as an outermost component, the movable member supporting the holder member;
a guide member guiding movement of the holder member relative to the frame; and
a driving section driving the holder member, wherein
the guide member includes a guide shaft fixed to the movable member and supported by a first support portion and a second support portion provided in the frame,
the guide shaft being fixed to the movable member at a first hole and a second hole located in the movable member,
the first support portion and the second support portion of the frame being respectively located outside the first hole and the second hole of the moveable member such that a distance between the first support portion and the second support portion of the frame is greater than a distance between the first hole and the second hole of the movable member, and
the moveable member moves relative to the frame while being integrated with the guide shaft.

6. A camera apparatus comprising:
a holder member holding either an imager or a lens that constitutes a part of a lens system, the holder member being movable in a straight line on a plane orthogonal to an optical axis of the lens system;
a movable member attached to a frame that serves as an outermost component, the movable member supporting the holder member;
a guide member guiding movement of the holder member relative to the frame; and
a driving section driving the holder member, wherein
the guide member includes a guide shaft fixed to the movable member and supported by a first support portion and a second support portion provided in the frame,
the guide shaft being fixed to the movable member at a first hole and a second hole located in the movable member,
the first support portion and the second support portion of the frame being respectively located outside the first hole and the second hole of the movable member such that a distance between the first support portion and the second support portion of the frame is greater than a distance between the first hole and the second hole of the movable member, and
the movable member moves relative to the frame while being integrated with the guide shaft.

* * * * *